United States Patent [19]

Fock et al.

[11] Patent Number: 4,537,934

[45] Date of Patent: Aug. 27, 1985

[54] THERMOSETTING ADHESIVE

[75] Inventors: Jürgen Fock, Düsseldorf; Dietmar Schedlitzki, Essen, both of Fed. Rep. of Germany

[73] Assignee: Th. Goldschmidt AG, Essen, Fed. Rep. of Germany

[21] Appl. No.: 275,016

[22] Filed: Jun. 18, 1981

[30] Foreign Application Priority Data

Jul. 1, 1980 [DE] Fed. Rep. of Germany ....... 3024869

[51] Int. Cl.$^3$ .............................................. C08F 8/30
[52] U.S. Cl. .................................... 525/123; 525/127
[58] Field of Search ................................ 525/123, 127

[56] References Cited

U.S. PATENT DOCUMENTS

| 3,028,367 | 4/1962 | O'Brien | 525/123 |
| 3,108,986 | 10/1963 | Goldberg | 525/123 |
| 3,532,652 | 10/1970 | Zang | 525/127 |
| 3,542,741 | 11/1970 | Hartmann | 525/123 |
| 3,617,361 | 11/1971 | Reinhard | 525/123 |
| 3,919,351 | 11/1975 | Chang | 525/127 |
| 4,215,023 | 7/1980 | Strolle | 525/123 |
| 4,234,468 | 11/1980 | Dalibor | 525/123 |
| 4,293,661 | 10/1981 | Probst | 525/127 |

FOREIGN PATENT DOCUMENTS 2340040  3/1973  Fed. Rep. of Germany ...... 525/123

*Primary Examiner*—Melvyn I. Marquis
*Attorney, Agent, or Firm*—Toren, McGeady, Stanger, Goldberg and Kiel

[57] ABSTRACT

A thermosetting adhesive containing as the active components (a) a copolymer which is obtained by the polymerization of
  ($a_1$) 35 to 70 weight percent of one or more alkyl esters of acrylic and/or methacrylic acid, with 1 to 8 carbon atoms in the alkyl radical,
  ($a_2$) 20 to 45 weight percent of acrylonitrile and/or methacrylonitrile and/or vinyl acetate,
  ($a_3$) 10 to 20 weight percent of one or more ω-hydroxyalkyl esters of acrylic and/or methacrylic acid with 1 to 5 carbon atoms in the alkyl radical,
  ($a_4$) 0 to 15 weight percent of acrylamide and/or methacrylamide, and
  ($a_5$) 0 to 35 weight percent of acrylic or vinyl monomers, whose composition deviates from that of components ($a_1$) and ($a_4$), wherein
  the sum of the monomers ($a_1$) to ($a_5$) amounts to 100 weight percent and the copolymer has a limiting viscosity of 0.05 to 0.6 (100 ml·g$^{-1}$) at 25° C. in methyl acetate, and (b) one or more polyisocyanates and/or their partial reaction products with polyols, the molecule having on the average at least 2 isocyanate groups, components (a) and (b) being present in a ratio such that one hydroxyl group of component (a) corresponds to 1 to 1.5 isocyanate groups of component (b), as well as, if necessary, the usual additives, such as, accelerators, gluing auxiliaries, pigments and fillers. The adhesive can be cured at temperature of 80° C. and less, without decreasing the adhesion. In so doing, the moisture resistance and the resistance towards weathering are maintained. The adhesive is therefore particularly suitable for the manufacture of skis.

6 Claims, 1 Drawing Figure

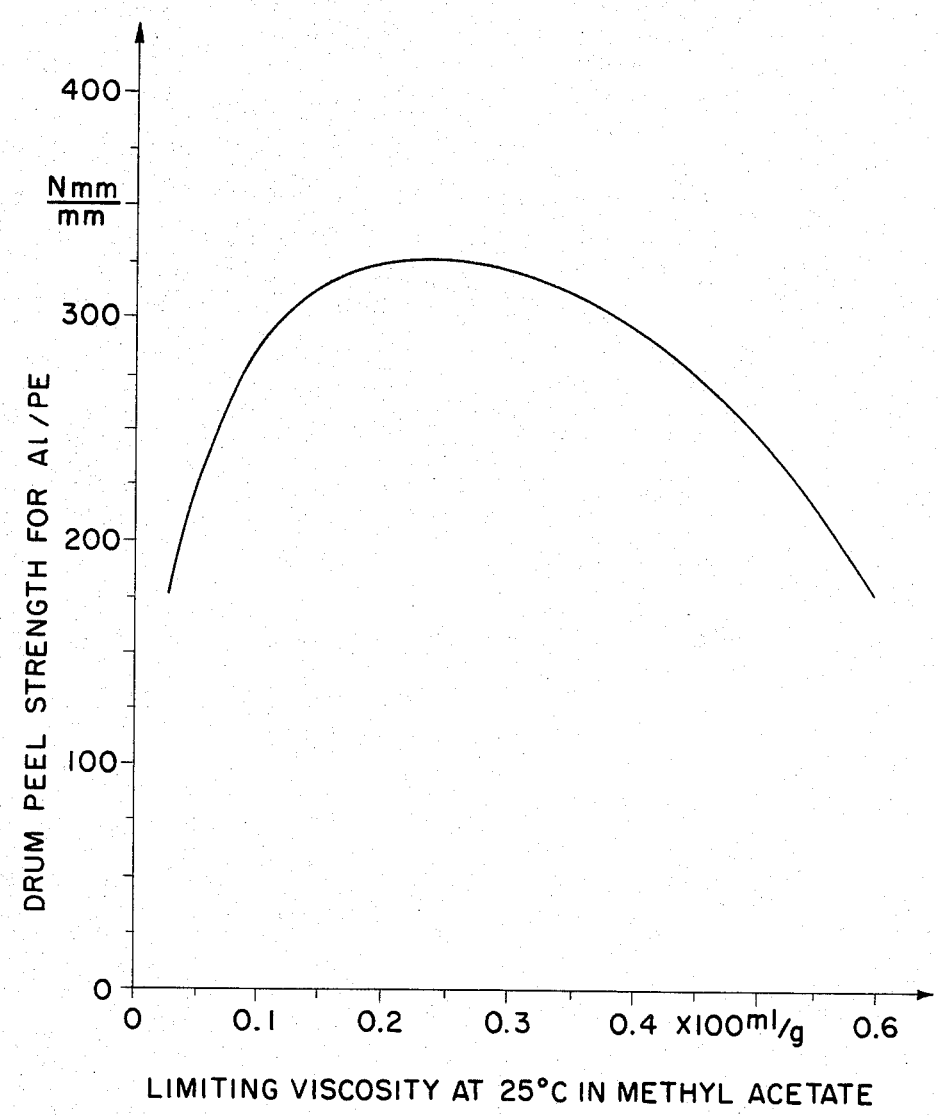

THERMOSETTING ADHESIVE

BACKGROUND OF THE INVENTION

1. Field of the Invention

The invention relates to a thermosetting adhesive based on a reactive acrylate and/or methacrylate copolymer.

2. Description of the Prior Art

German Pat. No. 25 24 197 discloses adhesives composed of a terpolymer, consisting of 20 to 45 weight percent of acrylonitrile and/or methacrylonitrile,
45 to 70 weight percent of an alkyl acrylate with 1 to 12 carbon atoms in the alkyl radical and
1 to 10 weight percent of acrylic, methacrylic or itaconic acid, wherein
the sum of the monomers amounting to 100 weight percent and the copolymer obtained having a limiting viscosity of 0.1 to 0.8 (100 ml·g$^{-1}$) at 20° C. in chloroform, optionally in admixture with up to 35 weight percent of an epoxide resin or a phenol-formaldehyde resin containing glycidyl groups.

These adhesives make glue bonds of high tensile shear strength and good peel strength possible. The adhesive can be used as films for gluing metal surfaces and also for gluing plastic film to metal surfaces. If these adhesives do not contain epoxide resins or phenol-formaldehyde resins containing glycidyl groups, they remain thermoplastic. In the presence of epoxide resins or phenol-formaldehyde resins containing glycidyl groups, the adhesives are thermosetting with temperatures of about 130° C. being required for the curing.

In German patent application No. P 29 26 284.8-43, which has not yet been published, a thermosetting adhesive is described which contains the following active components:

(a) 20 to 80 weight percent of a copolymer with was obtained by the polymerization of
 (a$_1$) 20 to 45 weight percent of acrylonitrile and/or methacrylonitrile,
 (a$_2$) 35 to 65 weight percent of one or several alkyl esters of acrylic and/or methacrylic acid with 1 to 12 carbon atoms in the alkyl radical,
 (a$_3$) 10 to 20 weight percent of acrylic, methacrylic and/or itaconic acid,
 (a$_4$) 0 to 15 weight percent of acrylamide and/or methacrylamide,
 the sum of the monomers amounting to 100 weight percent and the copolymer having a limiting viscosity of 0.1 to 0.8 (100 ml·g$^{-1}$) at 20° C. in methyl acetate,
(b) 10 to 70 weight percent of an epoxide resin and/or a phenol-formaldehyde resin containing glycidyl groups,
(c) 0.2 to 15 weight percent of a hardener for the components (b), which is effective at elevated temperatures,
(d) 0 to 5 weight percent of an accelerator for the reaction of components (b) with components (a) and (c),
the sum of (a) to (d) amounting to 100 weight percent,
and optionally the usual additives, such as, gluing auxiliaries, adhesion promoters, pigments and fillers.

Compared to the adhesives of German Pat. No. 25 24 197, these adhesives cure at temperatures of 100° C. to 130° C. Consequently, it is possible to keep the thermal stress on the plastics to be glued at a lower level and to retain desirable properties, such as, the surface quality and gloss of the plastics. The composite materials of plastic and metal, obtained by the gluing, can be molded in the usual manner without impairing the adhesion.

SUMMARY OF THE INVENTION

We have discovered an adhesive which can be cured reactively at lower temperatures, for example, already at 80° C. and below. As a result, such adhesives have wider applicability than the higher curing materials, especially in gluing plastics. They can be used in the manufacture of skis based on composite materials, since temperatures of 90° C., for example, are not usually exceeded in the manufacture of skis. However, this lowering of the curing temperature cannot be achieved at the expense of a reduction in the adhesion to the contacting surfaces. With the present invention, the adhesive and elastic properties, as well as the resistance to moisture and other weathering effects are retained.

More particularly, the adhesive composition of the present invention contains as the active components:

(a) a copolymer, which is obtained by the polymerization of
 (a$_1$) 35 to 70 weight percent of one or several alkyl esters of acrylic and/or methacrylic acid with 1 to 8 carbon atoms in the alkyl radical,
 (a$_2$) 20 to 45 weight percent of acrylonitrile and/or methacrylonitrile and/or vinyl acetate,
 (a$_3$) 10 to 20 weight percent of one or several ω-hydroxyalkyl esters of acrylic and/or methacrylic acid with 1 to 5 carbon atoms in the alkyl radical,
 (a$_4$) 0 to 15 weight percent of acrylamide and/or methacrylamide, and
 (a$_5$) 0 to 35 weight percent of acrylic or vinyl monomers, whose composition is different from that of the components of (a$_1$) to (a$_4$),
 the sum of the monomers (a$_1$) to (a$_5$) amounts to 100 weight percent and the copolymer has a limiting viscosity of 0.05 to 0.6 (100 ml·g$^{-1}$) at 25° C. in methyl acetate; and
(b) one or more polyisocyanates and/or their partial reaction products with polyols, the molecule having at least 2 isocyanate groups on the average, wherein
components (a) and (b) being present in a ratio such that one hydroxyl group of component (a) corresponds to 1 to 1.5 isocyanate groups of component (b). The composition may also optionally contain conventional additives, such as, accelerators, gluing auxiliaries, pigments and fillers.

The principle on which the curing reaction of the adhesive of the present invention is based is the reaction between the hydroxyl groups of the ω-hydroxyalkyl esters of acrylic and/or methacrylic acid (component a$_3$) and the isocyanate groups of the polyisocyanates or their partial reaction products with polyols (component b). However, in practice, with this reaction principle, the adhesion of the adhesives to the surface of plastics is generally unsatisfactory when polyethers are used as the polyol component. When polyester polyols are used, the adhesion to metal surfaces is not permanently resistant to the action of water or water vapor. However, with the composition of the present invention, all of these desired properties are present.

BRIEF DESCRIPTION OF THE DRAWING

The FIGURE is a graph of the drum peel strength variation with limiting viscosity.

DESCRIPTION OF THE PREFERRED EMBODIMENT

The preferred acrylate and/or methacrylate copolymer used in the present invention has a limiting viscosity of 0.1 to 0.4 (100 ml·g$^{-1}$) at 25° C. in methyl acetate.

The polymerization of the copolymer (a) is accomplished by conventional procedures known to those skilled in the art. The polymerization can be carried out as an emulsion or a solution polymerization. The polymerization in a solvent is preferred, because, in view of the reaction with isocyanates, careful drying of the products of an emulsion polymerization is required.

Examples of suitable monomers ($a_1$) are ethyl acrylate, butyl acrylate, butyl methacrylate, methyl acrylate, methyl methacrylate, 2-ethylhexylacrylate and 2-ethylhexylmethacrylate.

Examples of suitable monomers ($a_3$) are 2-hydroxyethyl acrylate or -methacrylate, 3-hydroxypropylacrylate or -methacrylate, 1,4-butanediol-monoacrylate and 1,4-butanediol-monomethacrylate.

Examples of suitable monomers ($a_5$) are styrene, vinyl propionate and methyl vinyl ketone.

As the polyisocyanate, a polyisocyanate of the general formula

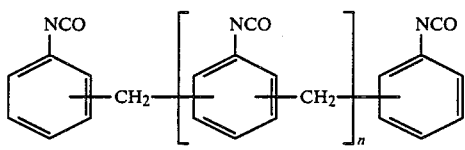

in which n≦3, or

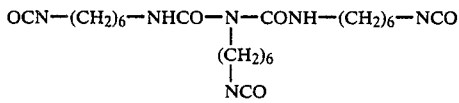

is preferably used. These isocyanates are commercially available. However, other polyisocyanates, such as, for example, 1,6-hexamethylendiisocyanate, 2,4,4-trimethyl-1,6-hexamethylendiisocyanate, 3-isocyanatomethyl-3,5,5-trimetylcyclohexylisocyanate, 1,4-tetramethylendiisocyanate, 2,4- and 2,6-hexahydrotoluylene diisocyanate, hexahydro-1,3- or -1,4-phenylene-diisocyanate, 1,3- and 1,4-phenylenediisocyanate, 2,4- and 2,6-toluylene diisocyanate, 4,4'-diisocyanato-diphenylmethane, naphthylene-1,5-diisocyanate, m-xylylene-diisocyanate, tris-(4-isocyanatophenyl)-thiophosphate, 4,4',4''-triisocyanato-triphenylmethane, 2,4,6-triisocyanato-toluene or 2,4,4'-triisocyanato-diphenylether are suitable. The isocyanates must, however, fulfill the condition that they have on the average at least 2 isocyanate groups per molecule.

Instead of the pure polyisocyanates, their partial reaction product with polyether or polyester polyols can also be used.

In this connection, an adhesive is preferred in which component (b) is a partial reaction product of one or several polyisocyanates with polyether or polyester polyols having a molecular weight less than 2000, and having on the average at least 2 hydroxyl groups in the molecule. The polyisocyanates are reacted with the polyols in a ratio such that one hydroxyl group corresponds to 1.5 to 3 isocyanate groups. Examples of suitable polyether polyols are linear or branched polyether polyols based on ethylene oxide, propylene oxide and butylene oxide, polythioethers and adducts of ethylene oxides on polyamines and alkoxylated phosphoric acids.

Examples of suitable polyester polyols are linear or branched polyester polyols, such as, those obtained in the usual manner from multifunctional and preferably bifunctional carboxylic acids, such as, adipic acid, sebacic acid, phthalic acid, halogenated phthalic acids, maleic acid, 1,2,4-benzenetricarboxylic acid, monomeric, dimeric or trimeric fatty acids and multifunctional alcohols, such as, for example, ethylene glycol, polyethylene glycols, propylene glycol, polypropylene glycols, 1,3- and 1,4-butanediol, 2,2-dimethyl-1,3-propanediol, 1,6-hexanediol, 1,1,1-trimethylolpropane, hexanetriols or glycerin.

The reaction of polyisocyanates with the polyether or polyester polyols is accomplished in a ratio such that, on the average, there are at least 2 isocyanate groups per molecule in the reaction product.

The curing time or the curing temperature of the adhesive can be shortened or reduced significantly in the conventional manner by the addition of an accelerator. An especially preferred adhesive is one which contains, as an accelerator, up to 2 weight percent, based on the sum of the components (a) and (b) of a tertiary amine and/or an organic compound of tin. As tertiary amines, dimethylbenzylamine, dicyclohexylmethylamine, dimethylpiperazine, dimethylaminoethanol, 1,2-dimethylimidazole, N-methyl-morpholine or N-ethylmorpholine, dimethylcyclohexylamine, 1-aza-bicyclo-(3,3,0)-octane or 1,4-diaza-bicyclo-(2,2,2)-octane are especially suitable. Examples of readiy usable organic compounds of tin are dibutyl tin dilaurate or tin(II) octoate.

The inventive adhesive may also contain other auxiliaries. Examples of such auxiliaries are gluing auxiliaries, such as, for example, acrylonitrile-butadiene copolymers, polyamides, polychloroprene or polyurethanes. These gluing auxiliaries are preferably added in an amount up to 15 weight percent, based on 100 weight percent of components (a) to (b).

Pigments and/or fillers can also be added to the adhesive as auxiliaries. For this purpose, inorganic as well as organic products, such as, for example, titanium dioxide, iron oxide, chromium oxide, barium sulfate, powdered quartz, talc and bentonite, are suitable.

The following examples illustrate the present invention. They show methods for the manufacture of the inventive adhesives as well as their adhesion properties.

Preparation of the inventive adhesives

1. Raw Materials 1.1 Acrylic Copolymers (a)

In order to prepare acrylic copolymers (a) in solution, the monomers ($a_1$) to ($a_5$) (as defined hereinbefore) are reacted in a solvent mixture of 50 weight percent toluene, 30 weight percent methylethyl ketone and 20 weight percent of ethyl acetate at 70° to 80° C., with the addition of 0.3 to 0.7 weight percent of azobisisobutyronitrile and 0.4 weight percent of n-dodecyl-mercaptan by the usual solvent polymerization. The solids content of the copolymer solution is ca. 40 weight percent. The chemical composition of the individual copolymers and their limiting viscosit,y are given in Table 1.

1.2 Polyisocyanates

Two commercial products are used as polyisocyanates, namely, a polyphenylpolymethylene-polyisocyanate (crude MDI) of the general formula

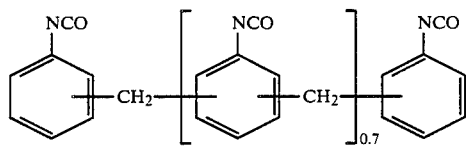

hereinafter designated (b1), and a triisocyanate of the formula

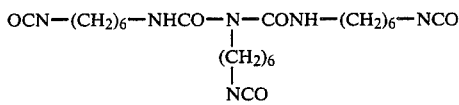

hereinafter designated (b2).

Both polyisocyanates are used in the solvent-free form.

Also used is a 60 weight percent solution in methyl ethyl ketone of the reaction product of 3 moles of 2,4-toluylenediisocyanate and 1 mole of a trifunctional polyester polyol with a molecular weight of 600, obtained from adipic acid, ethylene glycol, 2,2-dimethyl-1,3-propanediol and trimethylolpropane, hereinafter designated (b3).

The free isocyanate content, based on the solids, is:
polyisocyanate (b1): 31.2 weight percent
polyisocyanate (b2): 22.7 weight percent
polyisocyanate (b3): 11.2 weight percent.

Preparation of the Adhesives

For the preparation of the inventive adhesive solutions, the polyisocyanates are dissolved in the solution of the acrylic copolymers. Further solvent may be added in order to dilute the adhesive and to adjust the desired viscosity. Suitable solvents include ketones, such as, acetone, methyl ethyl ketone, or methyl n-propyl ketone; esters, such as, ethyl or butyl acetate; or aromatics, such as, toluene or xylene. Because of the reactivity of water towards isocyanate groups, anhydrous solvents must be used.

Further additives, such as, accelerators, gluing auxiliaries, pigments and fillers, may be dissolved or dispersed in the solution obtained.

The exact formulations of the adhesives are given in Table 1. Formulations 1 to 11 describe adhesives in accordance with the present invention. These are followed by the comparison adhesives, which are numbered 12 to 15. Formulations 12 and 13 contain the adhesives disclosed in German Auslegeschrift 25 24 197 or German Pat. No. P 29 26 284.8-43, in which an acrylic polymer, containing carboxyl groups, is cured with an epoxide resin. The epoxide resin is based on bisphenol A and epichlorohydrin, and has an epoxide equivalent of 180 g/gram equivalent.

Instead of the acrylic copolymer, comparison adhesive No. 14 contains a difunctional polyether polyol, based on propylene oxide and ethylene oxide and having a hydroxyl number of 90 mg KOH/g.

Instead of the acrylic copolymer, comparison adhesive No. 15 contains a polyester polyol with a functionality of ca. 2.5 and a hydroxyl number of 109 mg KOH/g. The polyester is obtained by the condensation of adipic acid with diethylene glycol, ethylene glycol and trimethylolpropane.

The quantities given for the individual components in Table 1 refer to the solid matter content.

Gluing and Testing the Application of the Adhesives

Two strength tests are used for testing the application of the adhesives:
(a) drum peel strength according to DIN 53 295
(b) angle peel strength according to DIN 53 282.

The drum peel strength is determined on three different composites:
aluminum/polyethylene (PE) composite,
aluminum/epoxide resin and glass fiber laminate (GFK) composite,
aluminum/ABS composite.

Aluminum sheets of grade Al Cu Mg 2pl FH are used. Before being glued, they are degreased and subjected to a chromate-sulfuric acid pickling. The polyethylene is roughened and pretreated, and the epoxide resin and glass fiber laminate (GFK) is ground.

The adhesives are applied in an amount of 60 g/m² of solids onto the adherent, and the solvent is evaporated at room temperature or at an elevated temperature, for example, at 70° C. The adhesive is cured for 12 minutes at 90° C. under a pressure of 0.5 N/mm². After cooling, peeling is carried out at 20° C.

The angle strength is determined on samples of roughened and pretreated polyethylene, 1.2 mm thick. The application of the glue, the evaporation of the solvents and the curing are carried out as described above. The angle peel test is carried out at 20° C. In addition, further samples are stored for three days in hot water at 95° C. Before the peeling test, these samples are cooled off in water at 20° C. and peeled while still wet. This storage in hot water is very suitable as a short-term test for evaluating the resistance of the adhesives to water and moisture. The strength values obtained are listed in Table 2. It is evident from the results that the comparison glues No. 12 and No. 13 provide strength values which are considerably less than those of the inventive glues No. 1 to No. 11. Comparison glues of formulation No. 14 adhere very poorly to plastic surfaces. Admittedly, comparison glues of formulation No. 15 adhere better to plastic surfaces, however, their strength decreases greatly after storage in water.

Drum Peel Strength as a Function of the Limiting Viscosity of the Copolymer (a)

In glue formulation No. 1, acrylic copolymers (a) with different limiting viscosities are used. The FIGURE shows the drum peel strength of the aluminum/polyethylene as a function of the limiting viscosity of the acrylic copolymer (a). It is evident that particular high strengths are obtained at limiting viscosities ranging from 0.1 to 0.4 (100 ml/g).

TABLE 1

Glue Formulations

| Formulation No. | Acrylic Copolymer (a) Composition Weight % | | Limiting Viscosity 100 ml/g | Parts by Weight | Polyisocyanate (b) Parts by Weight | Molar Ratio OH:NCO | Other Additions Parts by Weight |
|---|---|---|---|---|---|---|---|
| 1 | 54.0 ethylacrylate | $a_1$ | 0.15 | 100 | 18.1 (b1) | 1:1.20 | — |
|  | 31.4 acrylonitrile | $a_2$ | | | | | |
|  | 14.6 2-hydroxyethyl methacrylate | $a_3$ | | | | | |
| 2 | 30.0 ethylacrylate | $a_1$ | 0.18 | 100 | 18.9 (b1) | 1:1.25 | — |
|  | 24.0 methylmethacrylate | $a_1$ | | | | | |
|  | 31.4 acrylonitrile | $a_2$ | | | | | |
|  | 14.6 2-hydroxyethyl methacrylate | $a_3$ | | | | | |
| 3 | 54.0 ethylacrylate | $a_1$ | 0.18 | 100 | 18.0 (b1) | 1:1.10 | — |
|  | 32.0 vinylacetate | $a_2$ | | | | | |
|  | 14.0 2-hydroxy-ethylacrylate | $a_3$ | | | | | |
| 4 | 41.5 ethylacrylate | $a_1$ | 0.27 | 100 | 15.5 (b1) | 1:1.20 | — |
|  | 10.0 butylacrylate | $a_1$ | | | | | |
|  | 36.0 acrylonitrile | $a_2$ | | | | | |
|  | 12.5 2-hydroxyethyl methacrylate | $a_3$ | | | | | |
| 5 | 52.4 ethylacrylate | $a_1$ | 0.32 | 100 | 14.3 (b1) | 1:1.20 | — |
|  | 32.5 acrylonitrile | $a_2$ | | | | | |
|  | 11.5 2-hydroxyethyl methacrylate | $a_3$ | | | | | |
|  | 3.6 methacrylamide | $a_4$ | | | | | |
| 6 | 30.0 ethylacrylate | $a_1$ | 0.22 | 100 | 19.4 (b1) | 1:1.15 | — |
|  | 20.0 methylmeth-methacrylate | $a_1$ | | | | | |
|  | 33.8 acrylonitrile | $a_2$ | | | | | |
|  | 16.2 3-hydroxypropyl acrylate | $a_3$ | | | | | |
| 7 | 20.0 methylmethacrylate | $a_1$ | 0.15 | 100 | 16.1 (b1) | 1:1.10 | — |
|  | 15.0 butylmethacrylate | $a_1$ | | | | | |
|  | 31.0 acrylonitrile | $a_2$ | | | | | |
|  | 14.0 2-hydroxyethyl methacrylate | $a_3$ | | | | | |
|  | 20.0 styrene | $a_5$ | | | | | |
| 8 | 54.0 ethylacrylate | $a_1$ | 0.15 | 100 | 24.9 (b2) | 1:1.20 | 0.1 1,4-diazabi-cyclo(2,2,2)-octane |
|  | 31.4 acrylonitrile | $a_2$ | | | | | |
|  | 14.6 2-hydroxyethyl methacrylate | $a_3$ | | | | | |
| 9 | 54.0 ethylacrylate | $a_1$ | 0.15 | 100 | 50.4 (b3) | 1:1.20 | — |
|  | 31.4 acrylonitrile | $a_2$ | | | | | |
|  | 14.6 2-hydroxyethyl methacrylate | $a_3$ | | | | | |
| 10 | 30.0 ethylacrylate | $a_1$ | 0.18 | 100 | 18.9 (b1) | 1:1.25 | 20.0 titanium dioxide |
|  | 24.0 methylmethacrylate | $a_1$ | | | | | |
|  | 31.4 acrylonitrile | $a_2$ | | | | | |
|  | 14.6 2-hydroxy-ethyl methacrylate | $a_3$ | | | | | |
| 11 | 30.0 ethylacrylate | $a_1$ | 0.18 | 100 | 24.9 (b2) | 1:1.20 | 0.1 1,4-diazabi-cyclo(2,2,2)-octane |
|  | 24.0 methylmethacrylate | $a_1$ | | | | | |
|  | 31.4 acrylonitrile | $a_2$ | | | | | 10.0 polychloroprene moderately strong crystallizing Mooney plasticity 50 |
|  | 14.6 2-hydroxyethyl methacrylate | $a_3$ | | | | | |
| 12 DE-PS 25 24 197 | 60.9 ethylacrylate | | 0.35 | 80 | — | — | 20.0 epoxide resin |
|  | 35.4 acrylonitrile | | | | | | |
|  | 3.7 acrylic acid | | | | | | |
| 13 P 29 26 284.8-43 | 52.0 ethylacrylate | | 0.22 | 71 | — | — | 25.4 epoxide resin 3.6 pyromellitic dianhydride |
|  | 33.0 acrylonitrile | | | | | | |
|  | 15.0 acrylic acid | | | | | | |
| 14 | polyether polyol | | — | 100 | 25.9 (b1) | 1:1.20 | — |
| 15 | polyester polyol | | — | 100 | 31.4 (b1) | 1:1.20 | — |

TABLE 2
Testing the Application of the Glues

| Glue Formulation No. | Drum Peel Strength DIN 53 295 Nmm/mm | | | Angle Peel Strength DIN 53 282 N/mm | |
| --- | --- | --- | --- | --- | --- |
| | Al/Pe | Al/GFK | Al/ABS | Without Stress | After Storing for 3 Days in Hot Water |
| 1 | 315 | 65 | 85 | 4.8 | 4.5 |
| 2 | 305 | 76 | 110 | 5.3 | 5.2 |
| 3 | 310 | 71 | 90 | 4.5 | 4.0 |
| 4 | 285 | 50 | 80 | 4.9 | 4.8 |
| 5 | 290 | 48 | 88 | 5.4 | 5.0 |
| 6 | 285 | 53 | 105 | 5.0 | 4.7 |
| 7 | 315 | 65 | 88 | 4.8 | 4.6 |
| 8 | 270 | 60 | 80 | 4.7 | 4.5 |
| 9 | 265 | 64 | 88 | 4.8 | 4.6 |
| 10 | 295 | 56 | 106 | 5.1 | 5.0 |
| 11 | 290 | 54 | 98 | 4.6 | 4.5 |
| Comparison Glue | | | | | |
| 12 | 45 | 20 | 27 | 1.2 | 1.0 |
| 13 | 70 | 28 | 39 | 1.4 | 1.2 |
| 14 | 5 | 3 | 5 | 0.1 | 0.07 |
| 15 | 145 | 39 | 48 | 3.0 | 0.73 |

We claim:

1. A thermosetting adhesive composition comprising
(a) a copolymer obtained by the polymerization of
- ($a_1$) 35 to 70 weight percent of one or more alkyl esters of acrylic or methacrylic acid having 1 to 8 carbon atoms in the alkyl radical,
- ($a_2$) 20 to 45 weight percent of acrylonitrile, methacrylonitrile or vinyl acetate,
- ($a_3$) 10 to 20 weight percent of one or more ω-hydroxyalkyl esters of acrylic or methacrylic acid having 1 to 5 carbon atoms in the alkyl radical,
- ($a_4$) 0 to 15 weight percent of acrylamide or methacrylamide, and
- ($a_5$) 0 to 35 weight percent of acrylic or vinyl monomers, whose composition is different from that of components ($a_1$) to ($a_4$), wherein the sum of the monomers ($a_1$) to ($a_5$) totals 100 weight percent and the copolymer possesses a limiting viscosity of 0.05 to 0.6 (100 ml·g$^{-1}$) at 25° C. in methyl acetate; and (b) one or more polyisocyanates or the partial reaction product of a polyisocyanate with a polyol, the product having at least 2 isocyanate groups per molecule on the average, wherein components (a) and (b) are present in a ratio such that one hydroxyl group of component (a) corresponds to 1 to 1.5 isocyanate groups of component (b).

2. The adhesive composition of claim 1 wherein component (a) has a limiting viscosity of 0.1 to 0.4 (100 ml·g$^{-1}$) at 25° C. in methyl acetate.

3. The adhesive composition of claim 1 or 2 wherein component (b) is a polyisocyanate having the formula

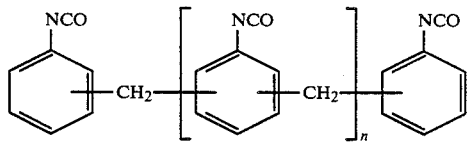

in which $n \leq 3$, or

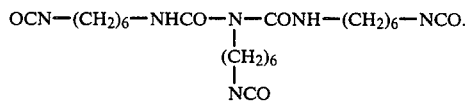

4. The adhesive composition of claim 1 or 2 wherein component (b) is a partial reaction product of one or more polyisocyanates with a polyether polyol or polyester polyol whose molecular weight is less than 2000, the polyether or polyester polyol having, on the average, at least two hydroxyl groups in the molecule and the polyisocyanates having been reacted with the polyols in a ratio such that 1.5 to 3 isocyanate groups correspond to one hydroxyl group.

5. The adhesive composition of claim 1 or 2 which further comprises up to 2 weight percent based on the sum of components (a) and (b), of a tertiary amine or an organic tin compound as an accelerator.

6. The adhesive composition of claim 1 or 2 which further comprises an additive selected from the group consisting of accelerators, gluing auxiliaries, pigments, and fillers.

* * * * *